April 1, 1924.

O. Z. MILLER

PACKING

Filed Jan. 28, 1921

1,488,695

Inventors
Ose Z. Miller

By
Hardway Cathey
Attorneys

Patented Apr. 1, 1924.

1,488,695

UNITED STATES PATENT OFFICE.

OSE Z. MILLER, OF HOUSTON, TEXAS.

PACKING.

Application filed January 28, 1921. Serial No. 440,801.

*To all whom it may concern:*

Be it known that I, OSE Z. MILLER, a citizen of the United States, residing at Houston, in the county of Harris and State of Texas, have invented certain new and useful Improvements in a Packing, of which the following is a specification.

This invention relates to new and useful improvements in a packing.

One object of the invention is to provide a durable packing for use in stuffing boxes and the like which will withstand heat and wear and which will not permit leakage through the stuffing box.

Another object is to produce a packing which is of a simple construction and which may, therefore, be cheaply and easily manufactured and readily applied.

With the above and other objects in view the invention has particular relation to certain novel features of construction and use, an example of which is given in this specification and illustrated in the accompanying drawings, wherein:—

Figure 1:
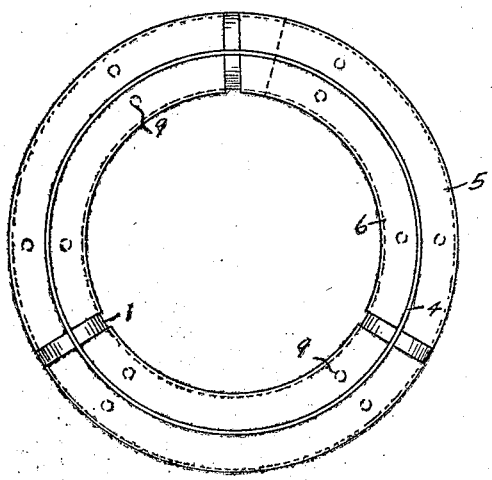
Figure 1 shows a plan view of the packing ring.
Figure 2:
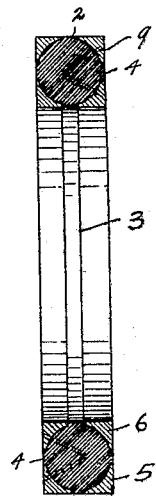
Figure 2 shows a transverse sectional view.

Referring now more particularly to the drawings, the numeral 1 designates a rubber core which is of an open ringlike form and which is composed of rubber specially treated to withstand heat. This core has an outer and an inner annular rib 2 and 3, respectively, and the lateral annular ribs 4, 4.

The core is encased within a sectional metallic sheath formed of the outer sections 5 and the inner sections 6. These sections are formed of soft metal, composed of approximately 12% antimony and 88% lead, and are arcuate in general contour. In cross section they are substantially triangular with their inner sides concaved to conform to the contour of the core. The sections of the sheath are held spaced apart by the ribs 2, 3 and 4, and the inner rib 3 does not come quite flush with the inner face of the sheath so as not to receive the wear of the rod 7, working through the stuffing box 8. The outer sections 5 and also the inner sections 6 are spaced apart forming joints, and in making up the stuffing box, these joints are broken in the usual way so as to make a perfectly tight joint.

The sections are tied to the core by the ties 9. These are preferably formed of copper wires which are embedded in the rubber and whose ends protrude. In forming the ring the core 1 is first constructed and placed in a suitable mould and the sections of the sheath are then moulded around it, the ends of the ties being embedded in said sections, as the same are moulded, and said sections thus being securely tied in place.

Figure 3:
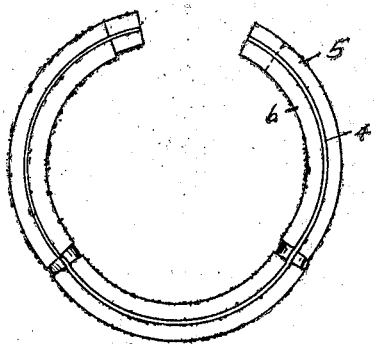
Figure 3 shows a plan view of the ring in open position.
Figure 4:
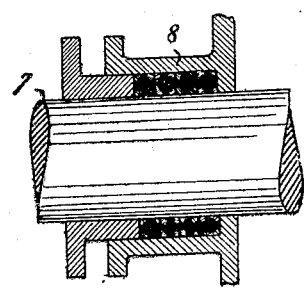
Figure 4 shows a sectional view of a stuffing box wherein my improved form of ring is employed.

As illustrated in Figure 3 the sections of the sheath, at one end of the ring project beyond said end forming, in effect a socket into which the other end of the ring fits so as to form a closed packing ring in use.

What I claim is:—

1. A packing ring including a flexible core of an open ringlike form, a metallic sheath surrounding the core, said sheath being formed of arcuate sections which in cross sectional contour are substantially triangular with their inner sides concaved to conform to the contour of the core, ties embedded in the core whose outer ends protrude therefrom, said protruding ends being embedded in the corresponding sections of the sheath, said sheath projecting beyond the ring at one end forming a socket in which the other end of the core fits.

2. A packing ring including a flexible core of an open ringlike form, a sectional metallic sheath formed of outer and inner sections, said sections being substantially triangular, with their inner sides concaved, in cross sectional contour, the sections of the sheath being spaced apart, a tie embedded in the core and having protruding ends which are embedded in the material of respective sections of the sheath.

3. A packing ring including a rubber core of an open ring-like form, and having an outer annular rib, and lateral annular ribs, a metallic sheath formed of outer and inner sections approximately triangular in form, and whose inner sides are concaved, the sections of the sheath being held apart by said ribs, the inner side of the sheath projecting beyond the inner side of the core, ties securing the sections of the sheath to the core, said sheath projecting beyond the ring at one end, forming a socket into which the other end of the ring fits.

In testimony whereof I have signed my name to this specification in the presence of two subscribing witnesses.

OSE Z. MILLER.

Witnesses:
WM. A. CATHEY,
LOUISE CATHEY.